US007301096B2

(12) United States Patent
Strong et al.

(10) Patent No.: US 7,301,096 B2

(45) Date of Patent: Nov. 27, 2007

(54) INSULATOR FOR ENERGIZED TERMINAL OF ELECTRICAL DEVICE

(75) Inventors: James Alan Strong, Olean, NY (US); David R. Miller, Allegany, NY (US); Jonathan Jay Woodworth, Olean, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/275,710

(22) Filed: Jan. 25, 2006

(65) Prior Publication Data

US 2006/0164781 A1 Jul. 27, 2006

Related U.S. Application Data

(60) Provisional application No. 60/646,525, filed on Jan. 25, 2005.

(51) Int. Cl.
*H02B 1/02* (2006.01)

(52) U.S. Cl. ...................................... 174/5 R; 361/117

(58) Field of Classification Search ................ 361/117, 361/127; 174/2, 4 R, 5 R, 5 SB See application file for complete search history.

(56) References Cited

U.S. PATENT DOCUMENTS 2,012,689 A * 8/1935 Mcfarlin ........................ 174/8
3,192,312 A * 6/1965 Sauer ......................... 174/209
3,639,678 A * 2/1972 Muschong .................. 174/145
3,639,681 A * 2/1972 Ettlinger ................. 174/138 F
4,845,307 A * 7/1989 Cumming et al. .......... 174/5 R
5,568,132 A * 10/1996 Pratt .......................... 340/657
5,864,096 A 1/1999 Williams et al.
6,034,330 A * 3/2000 Pratt .......................... 174/178
6,291,774 B1 * 9/2001 Williams .................... 174/139
6,878,883 B1 4/2005 Rauckman
6,963,025 B1 11/2005 Kysely
7,075,015 B1 7/2006 Rauckman
7,154,034 B2 12/2006 Lynch
7,154,036 B2 12/2006 Lynch

OTHER PUBLICATIONS

Eco Electrical Systems, Inc. Catalog, Manufactures of Wildlife Protective Products, Created Sep. 5, 2004, 8 pages.

* cited by examiner

*Primary Examiner*—Ronald W. Leja
(74) *Attorney, Agent, or Firm*—Fish & Richardson P.C.

(57) ABSTRACT

An electrical apparatus of an electric distribution power system includes an electrical device having a high voltage electrical terminal that may be energized, an exterior insulating housing, and an insulator. The exterior insulating housing surrounds and insulates the electrical device, and includes an opening through which the high voltage electrical terminal protrudes such that at least a portion of the high voltage electrical terminal is external to the exterior insulating housing. The insulator covers the electrical terminal and is attached to the exterior insulating housing such that no current flow path is provided through an interface between the insulator and the exterior insulating housing.

23 Claims, 6 Drawing Sheets

INSULATOR FOR ENERGIZED TERMINAL OF ELECTRICAL DEVICE

CROSS REFERENCE TO RELATED APPLICATIONS

This application claims priority to U.S. application Ser. No. 60/646,525, filed Jan. 25, 2005, which is incorporated herein by reference in its entirety.

TECHNICAL FIELD

This description relates to an insulator that covers an energized terminal of an electrical device in a power system.

BACKGROUND

Electrical devices used in power systems include, for example, surge arresters, terminations, and bushings. Such electrical devices typically have a high voltage or energized terminal. For example, a surge arrester may include a high voltage or energized terminal and a ground terminal. If an object comes in direct contact with or is in close proximity to the energized terminal of the surge arrester and the object simultaneously is in direct contact with or is in close proximity to a grounded area, the object can become a conducting path for current of the power system. Current flow through or over the object results in a power system outage, and, if the object is an animal, may be a fatal event.

SUMMARY

In one general aspect, an electrical apparatus of an electric distribution power system includes an electrical device having a high voltage electrical terminal that may be energized, an exterior insulating housing, and an insulator. The exterior insulating housing surrounds and insulates the electrical device, and includes an opening through which the high voltage electrical terminal protrudes such that at least a portion of the high voltage electrical terminal is external to the exterior insulating housing. The insulator covers the electrical terminal and is attached to the exterior insulating housing such that no current flow path is provided through an interface between the insulator and the exterior insulating housing.

Implementations may include one or more of the following features. For example, the electrical device may include a surge arrester.

The insulator may be formed on the electrical device such that a bond between the insulator and the exterior insulating housing is established during formation of the insulator. The insulator may be formed from silicone rubber or from an elastomeric polymer. The insulator may serve as an animal protector.

The exterior insulating housing may include a weather shed to which the insulator is bonded or over which the insulator fits.

In another general aspect, a high voltage electrical apparatus of an electric distribution power system is made. An electrical device is surrounded with an exterior insulating housing and at least a portion of a high voltage electrical terminal extends through the exterior insulating housing such that the high voltage electrical terminal portion is external to the exterior insulating housing. The high voltage electrical terminal of the electrical device is covered with an insulator. The insulator is attached to the exterior insulating housing and the high voltage terminal is covered such that no current flow path is provided through an interface between the insulator and the exterior insulating housing.

Implementations may include one or more of the following features. For example, the electrical device may include a surge arrester.

The insulator may be attached to the exterior insulating housing by bonding the insulator to a weather shed of the exterior insulating housing. The insulator may be attached to the exterior insulating housing by forming the insulator on the exterior insulating housing such that a bond between the insulator and the exterior insulating housing is established during formation of the insulator. The insulator may be attached to the exterior insulating housing by fitting the insulator over a weather shed of the exterior insulating housing.

The insulator may be formed from silicone rubber. The insulator may be formed from an elastomeric polymer.

In another general aspect, a high voltage terminal of an electrical device within an electric distribution power system is insulated. A high voltage electrical terminal that is external to an exterior insulating housing is covered with an insulator. The insulator is attached to the exterior insulating housing such that no current flow path is provided through an interface between the insulator and the exterior insulating housing.

Implementations may include one or more of the following features. For example, the electrical device may include a surge arrester.

The insulator may be attached to the exterior insulating housing by bonding the insulator to a weather shed of the exterior insulating housing. The insulator may be attached to the exterior insulating housing by forming the insulator on the exterior insulating housing such that a bond between the insulator and the exterior insulating housing is established during formation of the insulator. The insulator may be attached to the exterior insulating housing by fitting the insulator over a weather shed of the exterior insulating housing.

Implementations of the insulator provide effective electrical insulation of the energized areas of a surge arrester or another electrical device. The insulator may be used to prevent external influences, such as animals, tree limbs or other objects, from coming into direct contact with or coming too close to energized areas of the surge arrester. Particular implementation of the insulator provide a relatively small, inexpensive, and highly effective way for protecting wildlife, preventing costly nuisance power system outages, and improving power system reliability. Other potential advantages include improved insulation withstand performance by providing increased creep and strike distances and reduced potential for collateral damage to other power system components during the flow of power frequency fault current.

Other features will be apparent from the description, the drawings, and the claims.

DESCRIPTION OF DRAWINGS

Like reference symbols in the various drawings may indicate like elements.

DETAILED DESCRIPTION

Figure 1:
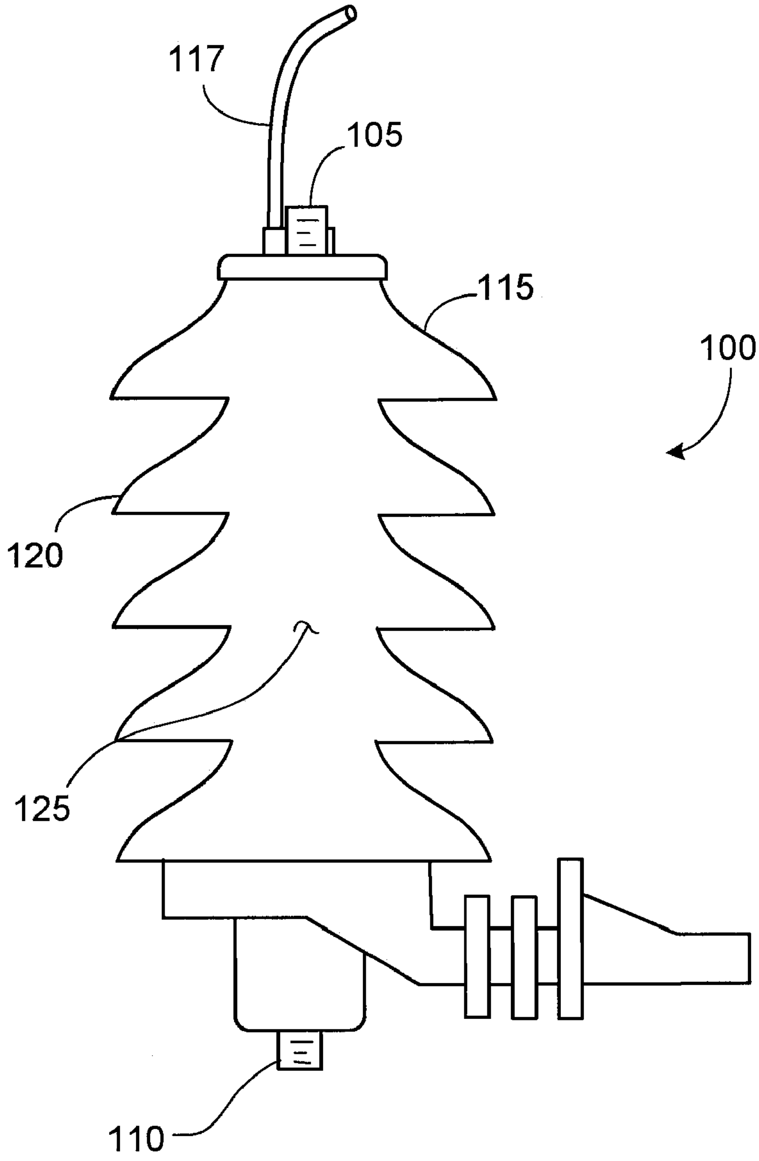
FIG. 1 shows a side view of a surge arrester that can be used in a power system.

Referring to FIG. 1, a surge arrester 100 includes a high voltage or energized terminal 105, a ground terminal 110, and an internal electrically-active conductive component such as a bonded-element stack 102 (shown in FIG. 3) that is disposed within an insulating housing 115. At least a portion of the energized terminal 105 is external to the insulating housing 115 such that a portion extends through one end of the housing 115 and connects to a first side of the bonded-element stack, and at least a portion of the ground terminal 110 extends through the opposite end of the housing 115 and connects to a second side of the bonded-element stack. The energized terminal 105 is electrically connected to one or more insulated line leads 117 for connection to other electrical components of the power system. As shown in FIG. 1, the housing 115 includes several weather sheds 120 that extend out from a main body 125 of the housing 115. The housing 115 is typically made of a suitable polymeric material. An arrester of this design is shown, for example, in U.S. Pat. No. 6,279,811, issued on Aug. 28, 2001, which is incorporated herein by reference.

Figure 2:
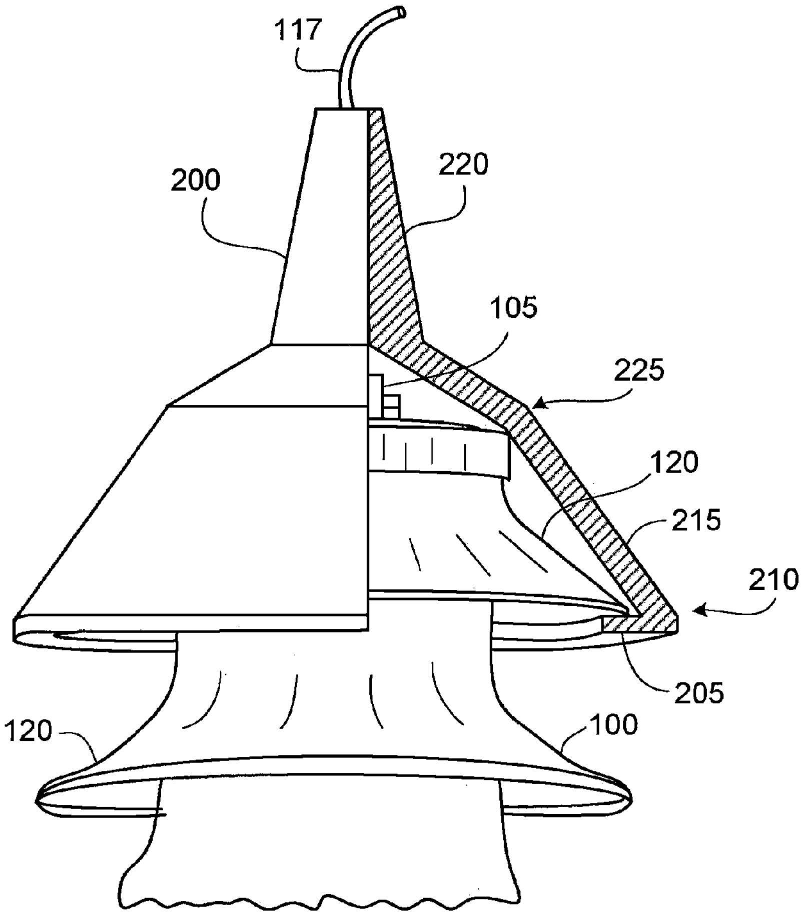
FIG. 2 shows a side view with a partial cross-sectional view of an insulator coupled to the surge arrester of FIG. 1.
Figure 3:
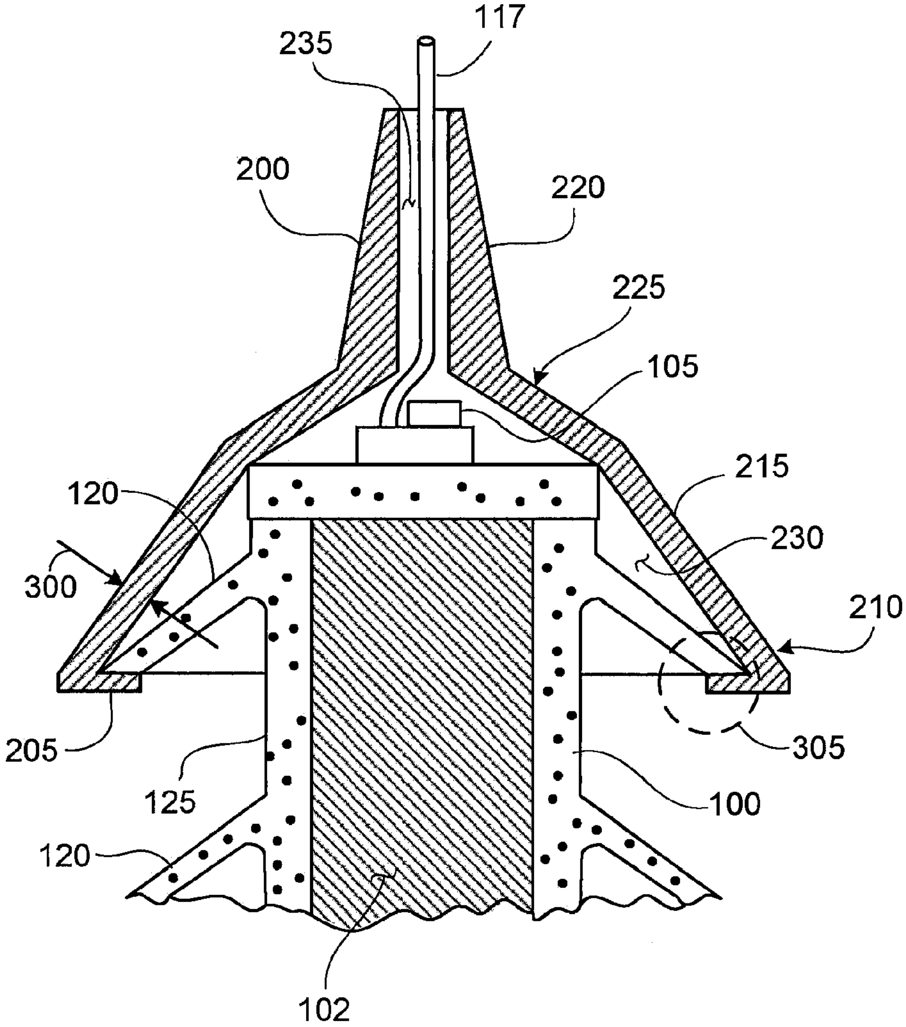
FIG. 3 shows a cross-sectional view of the insulator and the surge arrester of FIG. 2.

Referring to FIGS. 2 and 3, an electrical insulator 200 covers the energized terminal 105 of the surge arrester 100. The insulator 200 provides electrical insulation around energized areas in proximity to the top of the surge arrester 100. The insulator 200 prevents external objects, such as, for example, animals and tree limbs, from coming into direct contact with or coming too close to energized terminal 105 of the surge arrester 100.

The insulator 200 is generally shaped like a funnel to fit over the top of the surge arrester 100 and cover the terminal 105 and at least a portion of the first shed 120. The insulator 200 includes a circumferential internal ledge 205 that extends from a wider end 210 of a conical wall 215, and a tube 220 that extends from a narrow end 225 of the conical wall 215. The conical wall 215 has an opening 230 that is large enough to receive the first shed 120 and the terminal 105 of the surge arrester 100. The tube 220 has an opening 235 that is large enough to receive the one or more insulated line leads 117 that extend from the terminal 105. The ledge 205 is flexible, extends inward from the wider end 210, and has an inner diameter that is smaller than an outer diameter of the first shed 120. In this way, the ledge 205 extends below the first shed 120 to facilitate locking of the insulator 200 to the arrester 100.

The insulator 200 is fabricated separately from the surge arrester 100 and then installed by placing the insulator 200 over the surge arrester 100. The insulator 200 is pushed onto the surge arrester 100 so that the wider end 210 expands as the ledge 205 is moved outward from the first shed 120 until the ledge 205 reaches the edge of the first shed 120 and snaps back and extends below the first shed 120. The line lead 117 is inserted through the opening 235 of the tube 220 so that the lead 117 is accessible after the insulator 200 is installed on the surge arrester 100.

The insulator 200 is designed with several features that provide suitable and adequate electrical insulation. These features are the selection of material used in making the insulator 200, the geometry of the insulator, and the fit of the insulator 200 to the associated surge arrester 100. The insulator 200 can be made of an elastomeric insulating material, such as, for example, suitable polymers such as vinyl, silicone rubber, EPDM, EVA, or polyethylene. The elastomeric quality of the insulator 200 facilitates the installation of the insulator 200 to the surge arrester 100 because the insulator 200 is elastically deformed during installation. The insulator 200 has a geometry and a cross-sectional thickness 300 that fully covers at least a top portion of the surge arrester 100, and in particular, the energized terminal 105. The insulator 200 is designed to withstand power frequency voltages of up to 22 kV rms for 60 seconds while dry. Because the insulator 200 is designed with the above features, the interface 305 (that is, the region where the insulator 200 fits over the first shed 120) between the insulator 200 and the surge arrester 100 provides adequate dielectric strength or sufficient physical distance to prevent an electric discharge when a grounded object approaches the terminal 105.

As discussed above, the insulator 200 may be retrofitted to the surge arrester 100 shown in FIGS. 1-3. However, the insulator can be designed to be retrofitted to other types of surge arresters or other types of electrical devices found in power systems. In other implementations, the interface 305 between the insulator 200 and the surge arrester 100 can be facilitated using external adhesives such as, for example, suitable room temperature vulcanized (RTU) silicone rubber, butyl compounds, mastic materials, or other adhesive materials.

Figure 4:
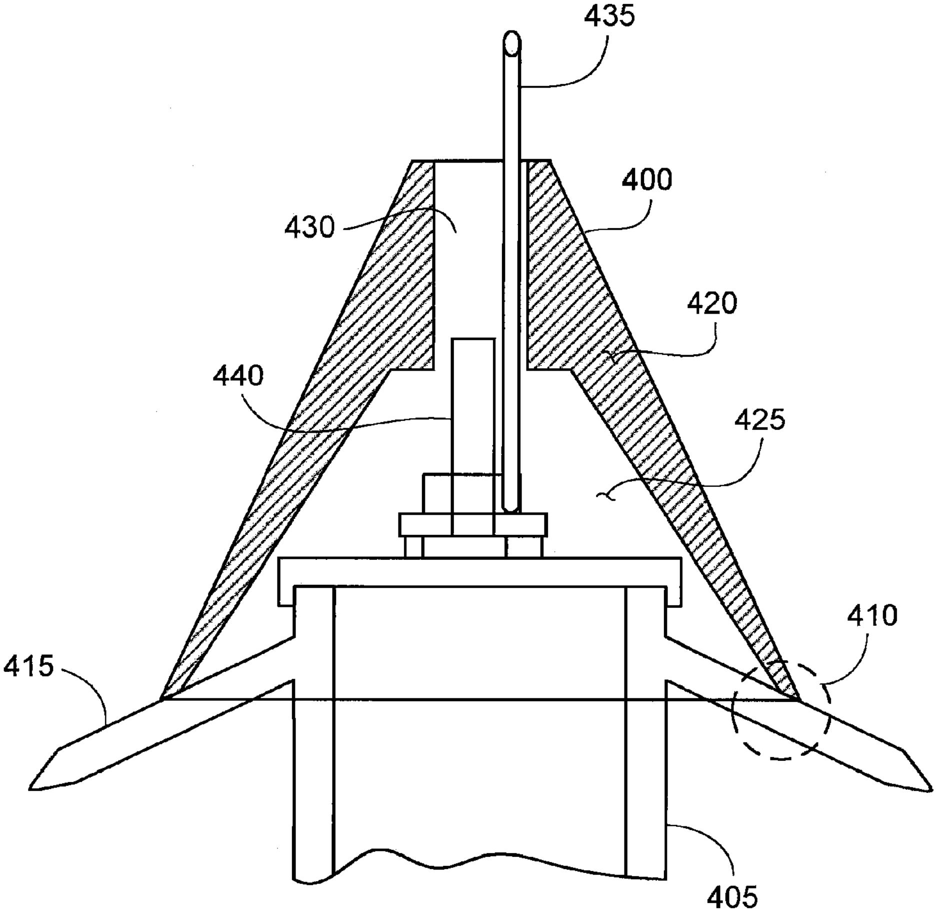
FIG. 4 shows an illustration of another implementation of an insulator and a surge arrester.

For example, FIG. 4 shows another implementation in which an insulator 400 is provided as part of an as-manufactured surge arrester 405. The insulator 400 is made of silicone rubber and the weather shed 415 is made of silicone rubber. In this design, an interface 410 between the insulator 400 and the surge arrester 405 is formed by directly bonding the insulator 400 to a weather shed 415 of the surge arrester 405. The bond is created during manufacture of the insulator 400 and the surge arrester 405 by casting, molding, potting, or any suitable bonding technique. Because the insulator 400 is directly bonded to the weather shed 415 of the surge arrester 405, electrical integrity is maintained between the insulator 400 and the housing of the surge arrester 405.

Like the insulator 200 described above, the insulator 400 is generally shaped like a funnel to fit over the top of the surge arrester 405 and to cover at least a portion of the first shed 415. The insulator 400 includes a conical wall 420 that defines an opening 425 that is large enough to receive at least a portion of the first shed 415 and an opening 430 that is large enough to receive one or more insulated line leads 435 that extend from a terminal 440 of the surge arrester 405.

Figure 5:
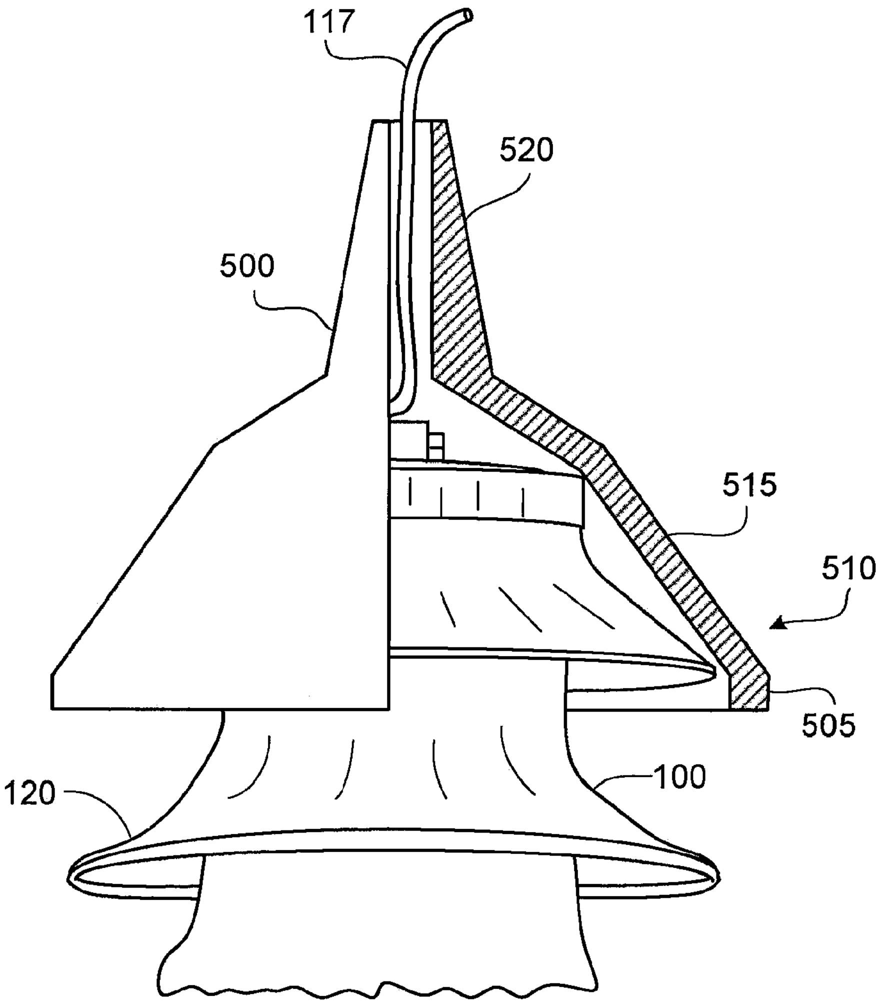
FIG. 5 shows a side view with a partial cross-sectional view of another implementation of an insulator coupled to the surge arrester of FIG. 1.

Referring to FIG. 5, in another implementation, an electrical insulator 500 covers the energized terminal 105 of the surge arrester 100. The electrical insulator 500 is designed much like the insulator 200 described above except that a wider end 510 of a conical wall 515 of the insulator 500 lacks a circumferential internal ledge (such as the ledge 205). Instead, the insulator 500 is designed with a circumferential lip 505 that extends from the conical wall 515.

The insulator 500 is suitably locked to the arrester 100 by at least the frictional interaction between a tube 520 and the insulated line leads 117. The insulator 500 may include ridges or notches along an inner surface of the tube 520, the conical wall 515, or the lip 505 to further facilitate locking of the insulator 500 to the arrester 100.

Figure 6:
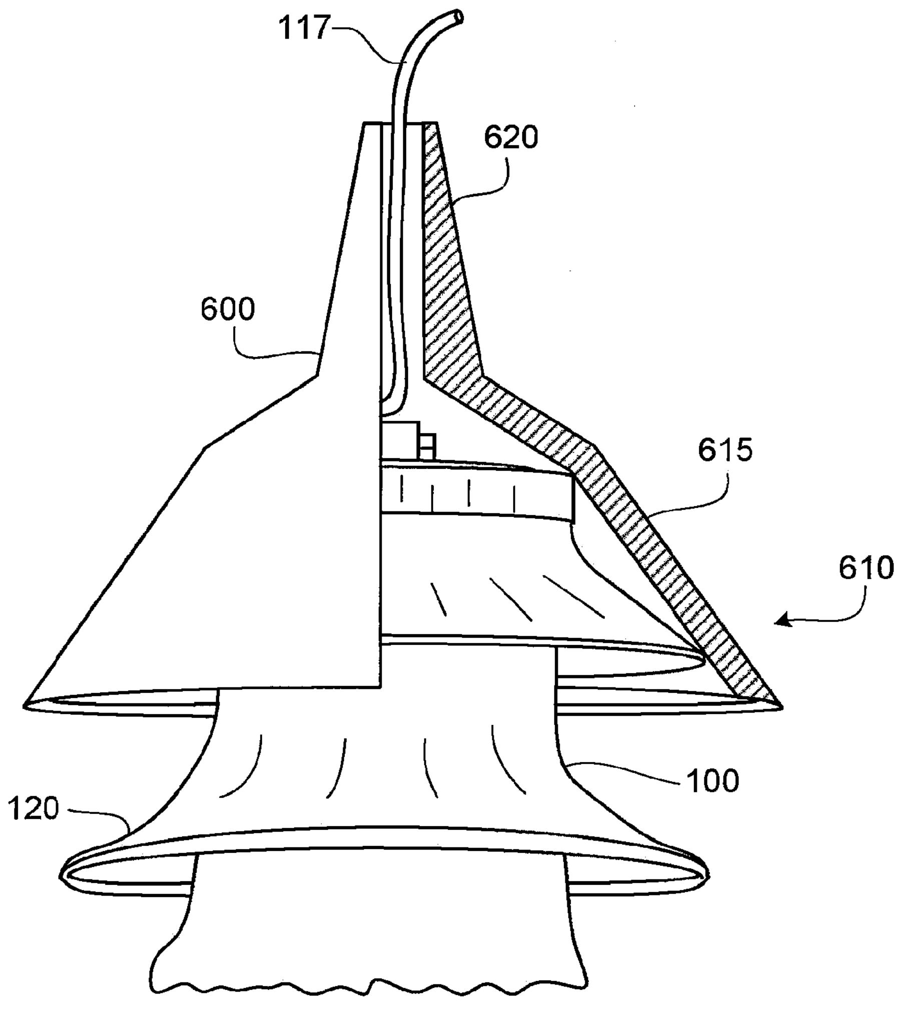
FIG. 6 shows a side view with a partial cross-sectional view of another implementation of an insulator coupled to the surge arrester of FIG. 1.

Referring to FIG. 6, in another implementation, an electrical insulator 600 covers the energized terminal 105 of the surge arrester 100. The electrical insulator 600 is designed much like the insulator 200 described above except that a wider end 610 of a conical wall 615 of the insulator 600 lacks a circumferential internal ledge (such as the ledge 205). Instead, the insulator 600 is designed such that the conical wall 615 extends an additional length to cover the first shed 120.

The insulator 600 is suitably locked to the arrester 100 by at least the frictional interaction between a tube 620 and the insulated line leads 117. The insulator 600 may include ridges or notches along an inner surface of the tube 620, or the conical wall 615 to further facilitate locking of the insulator 600 to the arrester 100.

Other implementations are within the scope of the following claims. For example, the insulator 400 can be made of vinyl, silicone rubber, EPDM, EVA, polyethylene, or other insulating materials that can be properly bonded to the material of the weather shed 415. The insulator 200, 400, 500, or 600 may have a geometry that minimizes the material required, and thereby reduces the cost of the insulator.

What is claimed is:

1. An electrical apparatus of an electric distribution power system, the apparatus comprising:

an electrical device having a high voltage electrical terminal that may be energized;

an exterior insulating housing that surrounds and insulates the electrical device, and includes an opening through which the high voltage electrical terminal protrudes such that at least a portion of the high voltage electrical terminal is external to the exterior insulating housing; and a one piece insulator covering the electrical terminal and being attached to the exterior insulating housing such that no current flow path is provided though an interface between the insulator and the exterior insulating housing.

2. The electrical apparatus of claim 1 wherein the electrical device comprises a surge arrester.

3. The electrical apparatus of claim 1 wherein the exterior insulating housing comprises a weather shed to which the insulator is bonded.

4. The electrical apparatus of claim 1 wherein the insulator is formed on the electrical device such that a bond between the insulator and the exterior insulating housing is established during formation of the insulator.

5. The electrical apparatus of claim 1 wherein the insulator is formed from silicone rubber.

6. The electrical apparatus of claim 1 wherein the insulator serves as an animal protector.

7. The electrical apparatus of claim 1 wherein the exterior insulating housing comprises a weather shed that the insulator fits over.

8. The electrical apparatus of claim 1 wherein the insulator is formed of an elastomeric polymer.

9. A method of making a high voltage electrical apparatus of an electric distribution power system, the method comprising:

surrounding an electrical device with an exterior insulating housing including extending at least a portion of the high voltage electrical terminal through the exterior insulating housing such that the high voltage electrical terminal portion is external to the exterior insulating housing;

covering the high voltage electrical terminal with an insulator by pushing the insulator onto the electrical device and over the exterior insulating housing such that the insulator is elastically deformed; and attaching the insulator to the exterior insulating housing and covering the high voltage terminal such that no current flow path is provided through an interface between the insulator and the exterior insulating housing.

10. The method of claim 9 wherein the electrical device comprises a surge arrester.

11. The method of claim 9 wherein attaching the insulator to the exterior insulating housing includes bonding the insulator to a weather shed of the exterior insulating housing.

12. The method of claim 9 wherein attaching the insulator to the exterior insulating housing includes forming the insulator on the exterior insulating housing such that a bond between the insulator and the exterior insulating housing is established during formation of the insulator.

13. The method of claim 9 further comprising forming the insulator from silicone rubber.

14. The method of claim 9 wherein attaching the insulator to the exterior insulating housing comprises fitting the insulator over a weather shed of the exterior insulating housing.

15. The method of claim 9 further comprising forming the insulator from an elastomeric polymer.

16. A method of insulating a high voltage terminal of an electrical device within an electric distribution power system, the method comprising:

covering a high voltage electrical terminal that is external to an exterior insulating housing with an insulator; and attaching the insulator to the exterior insulating housing by pushing the insulator over the exterior insulating housing such that the insulator is elastically deformed such that no current flow path is provided through an interface between the insulator and the exterior insulating housing.

17. The method of claim 16 wherein the electrical device comprises a surge arrester.

18. The method of claim 16 wherein attaching the insulator to the exterior insulating housing includes bonding the insulator to a weather shed of the exterior insulating housing.

19. The method of claim 16 wherein attaching the insulator to the exterior insulating housing includes forming the insulator on the exterior insulating housing such that a bond between the insulator and the exterior insulating housing is established during formation of the insulator.

20. The method of claim 16 wherein attaching the insulator to the exterior insulating housing comprises fitting the insulator over a weather shed of the exterior insulating housing.

21. A method of insulating a high voltage terminal of an electrical device within an electric distribution power system, the method comprising:

covering a high voltage electrical terminal that is external to an exterior insulating housing with an insulator; and attaching the insulator to the exterior insulating housing such that no current flow path is provided through an interface between the insulator and the exterior insulating housing by bonding the insulator and the exterior insulating housing together during manufacture of the insulator and the electrical device.

22. The method of claim 21 wherein attaching the insulator to the exterior insulating housing includes bonding the insulator to a weather shed of the exterior insulating housing.

23. The method of claim 22 wherein the insulator and the weather shed are made of silicone rubber.

* * * * *